No. 874,582. PATENTED DEC. 24, 1907.
W. H. FRANCIS.
METHOD OF TRANSPORTING BRICKS, &c.
APPLICATION FILED JUNE 17, 1907.
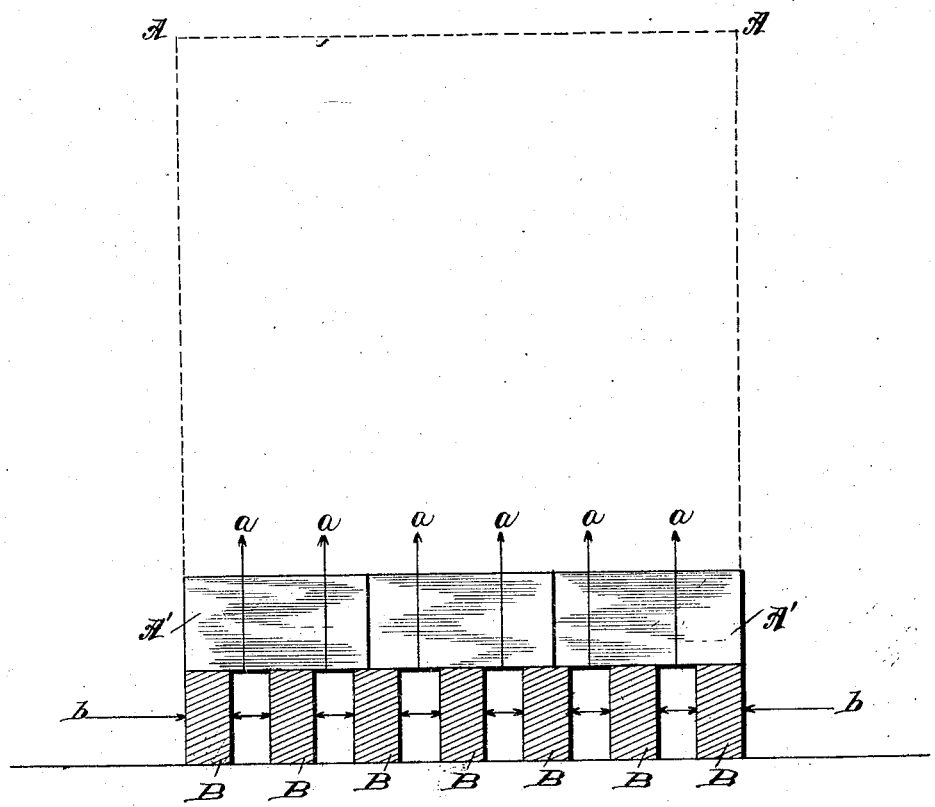
WITNESSES
E. M. Callaghan
Edw. W. Byrn
INVENTOR
WILLIAM H. FRANCIS
BY Munn & Co.
ATTORNEYS

UNITED STATES PATENT OFFICE.

WILLIAM HENRY FRANCIS, OF CHERRYVALE, KANSAS, ASSIGNOR OF ONE-HALF TO CHARLES FRANCIS, OF INDEPENDENCE, KANSAS.

METHOD OF TRANSPORTING BRICKS, &c.

No. 874,582.  Specification of Letters Patent.  Patented Dec. 24, 1907.

Application filed June 17, 1907. Serial No. 379,367.

*To all whom it may concern:*

Be it known that I, WILLIAM HENRY FRANCIS, a citizen of the United States, residing at Cherryvale, in the county of Montgomery and State of Kansas, have invented a new and useful Improvement in Methods of Transporting Bricks, &c., of which the following is a specification.

My invention is in the nature of a new method of transporting in bulk, from place to place weighty masses of material in detached but regular aliquot parts, such as bricks.

It is designed chiefly for transporting a stack of bricks of one hundred or more about the brick yard to or from the drying house and kiln or storage place in a safe and expeditious way, thereby saving much valuable time in hacking up the same and avoiding the chipping or damaging of the edges of the brick.

It will be understood that when a pile of bricks is hacked up in regular order in a pile, a difficulty which presents itself in any effort to transport the pile intact is that any lifting supports which are under the pile occupy a position entirely below the bottom layer of bricks and if the pile is transported and set down, the weight of the superincumbent mass on the lifting supports will pinch the latter to the earth or floor, so that it is not possible to withdraw the lifting supports from beneath the superincumbent mass.

In my invention I have devised a method of operation which is independent of any particular apparatus, but may be carried out by a variety of mechanical appliances and it entirely avoids the difficulty both of getting the lifting supports under the pile of bricks and extricating said supports after the pile has been transported, without taking down the pile of bricks or handling them separately in any way.

My method consists in applying the main lifting strain to a horizontal plane of the pile above its basic plane, or bottom layer of bricks, but below the center of gravity and at the same time picking up the basic layer of bricks by a clamping strain applied laterally to the basic layer at intervals between the bricks of this basic layer, so that the basic layer although transported along with the rest of the pile is supported by a pinching action on the sides of the brick applied laterally to the same. For carrying out this method the bricks of the basic layer are spaced apart from each other a half inch or more to allow the lifting supports and laterally pinching devices to be inserted between the bricks of the basic layer and which permits these lifting devices to be free of imprisonment beneath the basic layer when the load is set down on the floor.

As before stated, various mechanical appliances may be employed for carrying out my method which will readily suggest themselves to those skilled in the arts. One form of such an apparatus is shown in my Patent No. 859,445, granted July 9, 1907, but I have shown in the drawing an illustration of my method separate and apart from all apparatus which will serve to clearly elucidate the individuality of the method separate and apart from the mere function of the apparatus.

The figure is a diagrammatic illustration of the method.

A A A' A' represents a pile of bricks hacked up in regular order in the usual way to hold them bonded together. Only the lower layer A' A' of this pile is shown.

The basic layer of bricks B are set a regular distance apart, leaving spaces between the basic layer of bricks of suitable width to allow lifting supports in the shape of horizontal bars or fingers to pass beneath the layer A' A' for applying the vertical lifting strain to all of the superincumbent mass A A A' A' in the direction of the vertical arrows *a*. At the same time a pinching strain is applied in horizontal direction between each brick of the basic layer of bricks B, as shown by the horizontal arrows *b*. This pinching strain is applied at right angles to the main lifting strain and is designed simply and only for the purpose of lifting and carrying with the superincumbent mass the basic layer of bricks B, so that the whole pile may be moved intact. The basic layer of bricks B really forms so many short legs to the superincumbent mass and which, when the pile is set down, avoids the pinching of the lifting supports against the floor by the weight of the superincumbent mass. In other words the spaced-apart character of the basic layer B allows perfect freedom for the lifting supports to be removed from beneath the planes of the arrows *a* after the pile of bricks has been set down and as readily allows them to be taken up.

Although intended chiefly for use in transporting bricks, it will be understood that my method is not confined thereto, but may be used equally well for transporting all kinds of weighty material of aliquot parts when stacked in piles or masses.

I claim

1. The method of transporting masses of material in bulk, which consists in applying the lifting strain at a point below the center of gravity of the bulk but above the basic layer of the material and at the same time lifting the basic layer by a pinching strain applied below the plane of application of the lifting strain and at right angles to the same but above the basic surface of the mass.

2. The method of transporting separate blocks of material in stacked-up bulk, which consists in spacing apart the basic layer of such blocks, applying the lifting strain below the center of gravity of the mass above the basic layer and between the units of the basic layer and at the same time pinching and lifting the basic layer by a horizontal strain at right angles to the lifting strain and moving the entire pile intact.

WILLIAM HENRY FRANCIS.

Witnesses:
L. P. BROOKS,
GRACE RICHART.